United States Patent [19]
Voross et al.

[11] 3,940,977
[45] Mar. 2, 1976

[54] SIGNAL DISABLING ENGINE DIAGNOSING APPARATUS

[75] Inventors: Zoltan Voross, Elgin; James R. Caruth, Des Plaines; Yam C. Leung, Blommingdale, all of Ill.

[73] Assignee: Sun Electric Corporation, Chicago, Ill.

[22] Filed: July 17, 1974

[21] Appl. No.: 489,415

[52] U.S. Cl. ............................... 73/116; 324/15
[51] Int. Cl.² ........................................ G01L 3/26
[58] Field of Search ............. 73/116, 117.3; 324/15, 324/19

[56] References Cited
UNITED STATES PATENTS

| | | | |
|---|---|---|---|
| 3,630,076 | 12/1971 | Staudt | 73/117.3 |
| 3,788,129 | 1/1974 | Trussell | 73/116 |

*Primary Examiner*—James J. Gill
*Assistant Examiner*—Anthony V. Ciarlante
*Attorney, Agent, or Firm*—Molinare, Allegretti, Newitt & Witcoff

[57] ABSTRACT

The disclosure describes apparatus for disabling selected cylinders of an internal combustion engine operated by periodic cycles of ignition signals. The apparatus prevents one or more predetermined ignition signals in each cycle from energizing engine components, such as spark plugs, which normally receive the ignition signals. In order to achieve this purpose, a clock pulse generator generates a uniform pulse in response to the receipt of each ignition signal from the engine. Three bistable flipflop circuits are used to produce output signals having states representative of the number of clock pulses received from the clock pulse generator. Gating circuitry returns the output signals to an initial state after receipt of a predetermined number of clock pulses, such as the number of cylinders in the engine being diagnosed. As the apparatus commences operation, removable setting means set the output signals to their initial state by means of a setting pulse generated by one of the ignition signals. The repetition rate of the setting pulse is divided before being applied to the flipflop circuits in order to improve the diagnostic usefulness of the system. The transmission of the setting pulse also is delayed so that the output signals normally are returned to their initial state by the gating circuitry and clock pulses prior to the time the setting pulse is received by the flipflop circuits. A selecting circuit generates a disabling pulse in response to a predetermined state of the output signals. The disabling pulse switches a disabling device, such as a triac, to a conductive state to prevent a predetermined ignition signal from firing a selected spark plug, thereby aiding the diagnosis of the engine.

9 Claims, 8 Drawing Figures

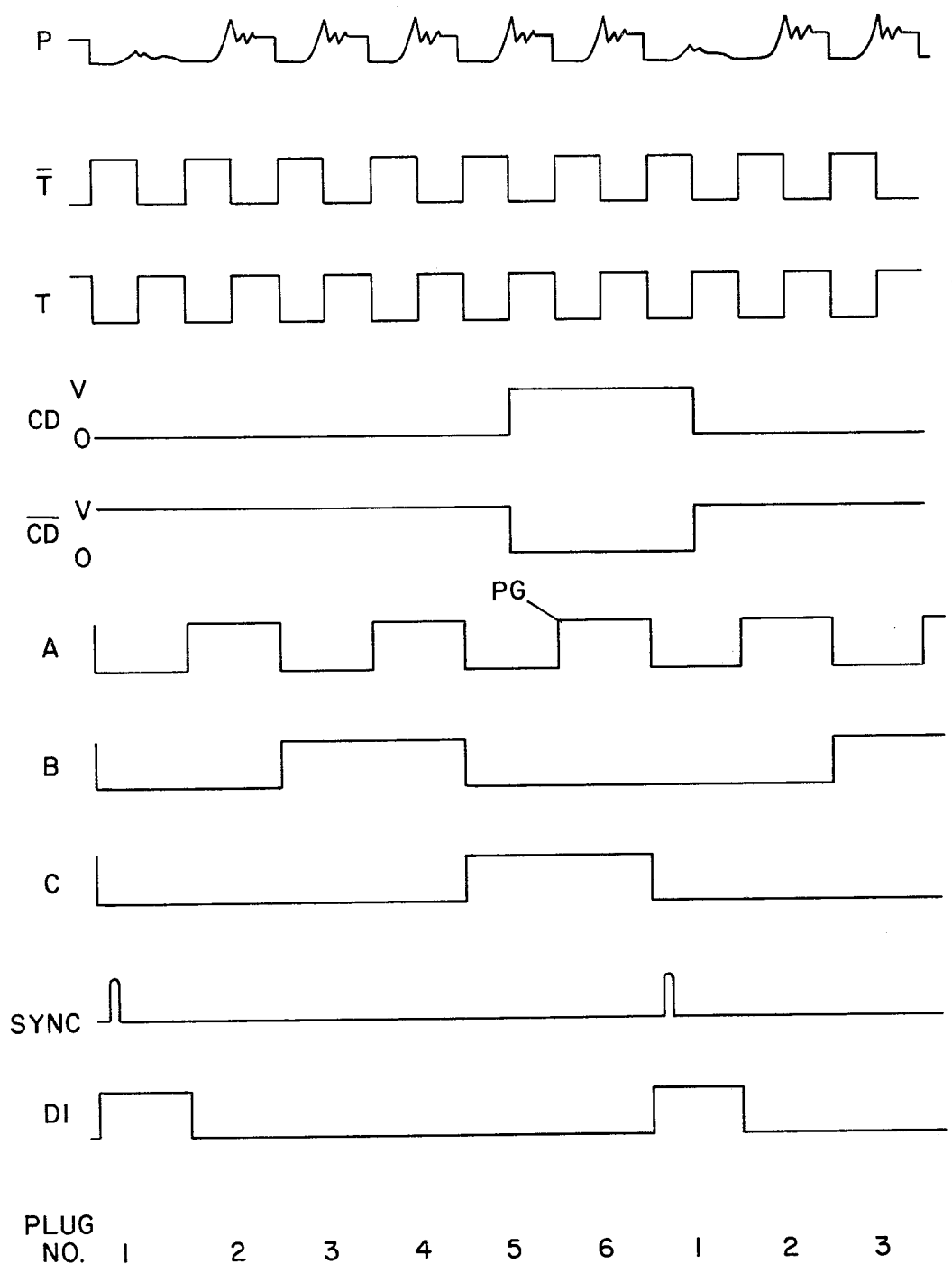

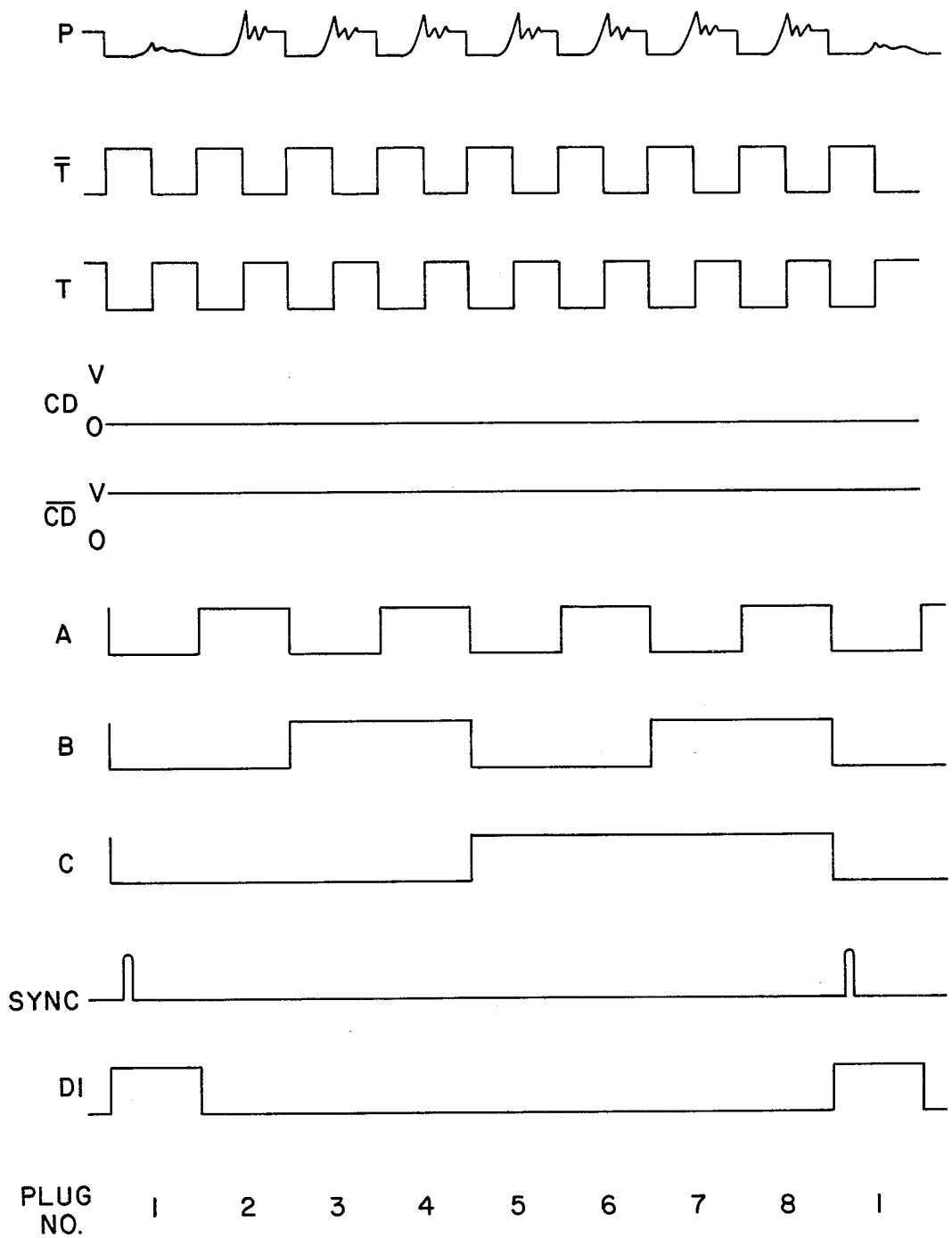

SIGNAL DISABLING ENGINE DIAGNOSING APPARATUS

BACKGROUND AND SUMMARY OF THE INVENTION

This invention relates to engine diagnostic apparatus and more particularly relates to apparatus for diagnosing an engine by disabling a predetermined component or cylinder thereof.

Automobile owners frequently complain that the engines of their automobiles run roughly or appear to "miss" on one or more cylinders. In order to diagnose the engine when such operating conditions are encountered, automobile mechanics have tried to discover the cylinder which is missing. In order to perform the disgnosis, many mechanics have found it useful to disable the cylinders of the engine one-at-a-time and to observe the resulting engine performance. If a properly operating cylinder is disabled, the engine runs more roughly, whereas if a defective cylinder is disabled, little or no change in the engine operation is observed. By systematically disabling the cylinders of the engine one-at-a-time, the mechanic may quickly locate the defective cylinder.

A variety of devices for performing the abovedescribed engine diagnosis have been described in the past. One such device is shown in U.S. Pat. No. 3,788,129 (Trussell — Jan. 29, 1974). Another such device is shown in U.S. Pat. No. 3,573,608 (Marino — Apr. 6, 1971) and U.S. Pat. No. 3,572,103 (Marino — Mar. 23, 1971).

Each of these devices has exhibited deficiencies which have limited their overall usefulness. For example, the Trussell apparatus employs a counter in which different counting states represent different engine cylinders depending on whether four, six 6 or eight cylinder engines are being diagnosed. This arrangement complicates the decoding circuitry connected to the output of the counter and generally requires the use of mechanical switches in such circuitry. The Marino apparatus employs a ring counter which must be reset during each engine cycle by a signal from a reference spark plug. This complicates the circuitry required when the reference spark plug is the device being disabled during the engine diagnosis.

The applicants have invented an improved cylinder disabling system in which a bistable device is used to produce binary output signals having states representative of the cylinders of an engine. The bistable device and associated gating circuitry are arranged so that a particular output signal state always represents the same engine cylinder irrespective of whether a four, six or eight cylinder engine is being diagnosed. This feature enables the system to employ an all electronic decoding network of a simple and inexpensive design.

In addition, the applicants' apparatus uses a setting pulse from a reference spark plug to set the output signals to an initial state only during the initial start up of operation. Thereafter, the output signals automatically are returned to the initial state without the use of the setting pulse. This feature enables the bistable device to automatically disable the cylinder employing the reference spark plug without the necessity for additional complicating circuitry.

In addition to the foregoing features, the applicants' invention divides the repetition rate of the setting pulses before applying them to the bistable device. This feature provides additional diagnostic flexibility which is lacking in a device which depends upon a setting pulse to reset a counter during every engine cycle.

DESCRIPTION OF THE DRAWINGS

These and other advantages and features of the present invention will hereafter appear in connection with the accompanying drawings in which like numbers refer to like parts throughout and in which:

FIG. 5 is an electrical schematic diagram illustrating in detail a preferred form of the multiplexer shown in FIG. 1;

FIG. 7 is a timing diagram illustrating the voltage waveforms at the like-lettered points in the variable modulus multi-state device for the six cylinder mode of operation; and FIG. 8 is a timing diagram illustrating the voltage waveforms at the like-lettered points in the variable modulus multi-state device for the eight cylinder mode of operation.

DESCRIPTION OF THE PREFERRED EMBODIMENT

Figure 1:
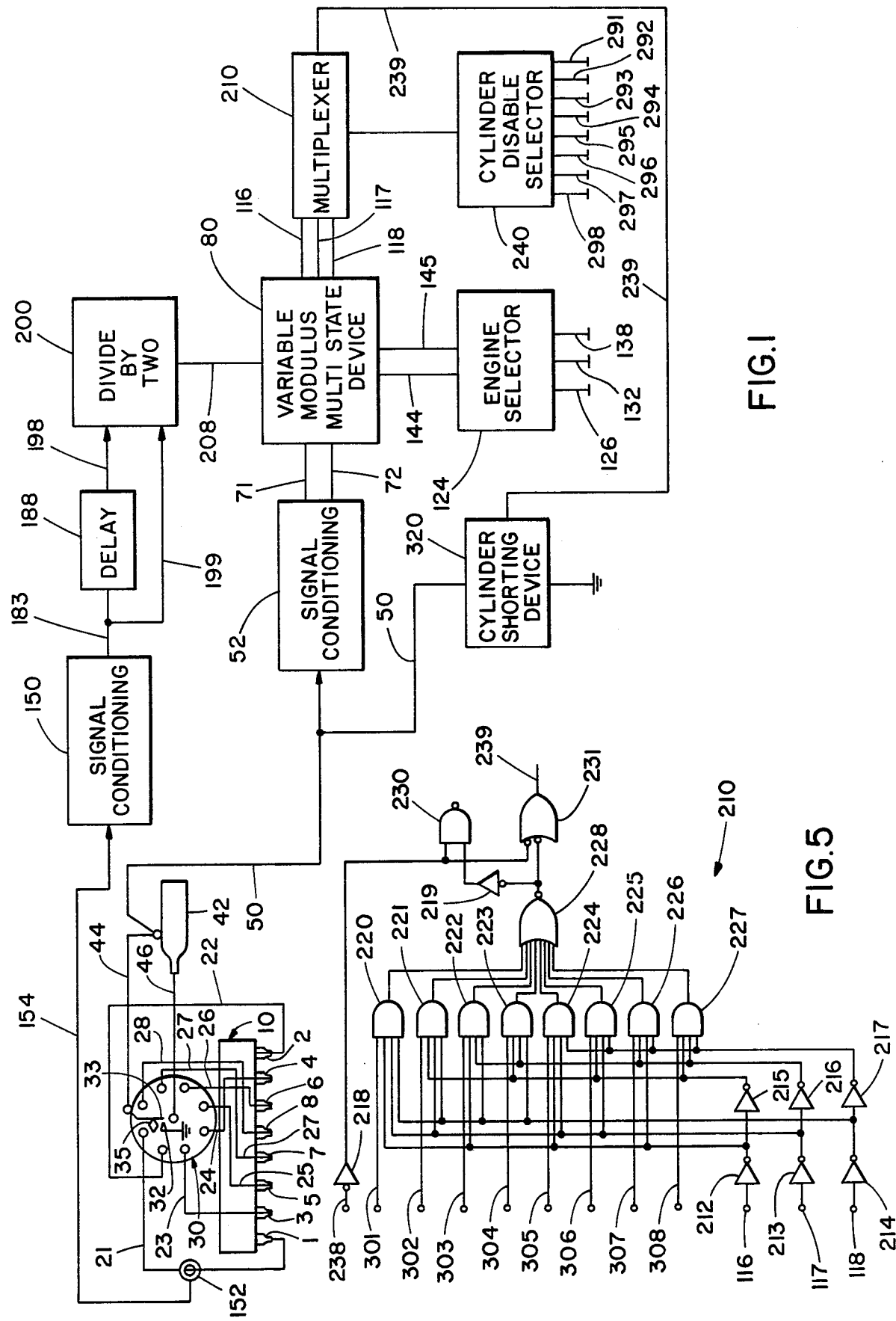
FIG. 1 is a block diagram, schematic drawing of a preferred embodiment of the present invention shown in connection with an exemplary engine to be diagnosed.

Referring to FIG. 1, the embodiment of the invention shown herein may be used for the diagnosis of an engine, such as exemplary internal combustion engine 10. Engine 10 comprises 8 cylinders into which are fitted spark plugs 1–8. The spark plugs are energized by wires 21–28, respectively, which originate in a conventional spark distributor 30.

The distributor includes a set of contact points 32, 33 which are opened and closed in synchronism with the engine by a cam 35. Distributor 30 is connected to the primary circuit of a coil 42 through a conductor 44. In a well-known manner, the distributor creates re-occuring cycles of 8 ignition signals (one ignition signal for each spark plug of the engine) which are conducted through conductor 44 to the primary of coil 42. By means of contact points 32, 33, a condensor (not shown) and the primary circuit, ignition signals P (FIG. 6) are generated. These signals induce high voltages in the coil secondary which are conducted through conductor 46 to a rotor (not shown) of the distributor. The rotor then distributes the high voltage ignition signals through wires 21–28 to the spark plugs.

Referring to FIG. 1, a preferred form of engine diagnostic apparatus made in accordance with the present invention basically comprises an input signal conditioning circuit 52, a variable modulus multi-state device 80, an engine selector 124, a signal conditioning circuit 150, a delay circuit 188, a divide-by-two circuit 200, a selecting multiplexer circuit 210 and a cylinder disable selector 240 which produce a disabling pulse, and a shorting circuit 320 which disables points 32, 33 in response to the disabling pulse.

Figure 2:
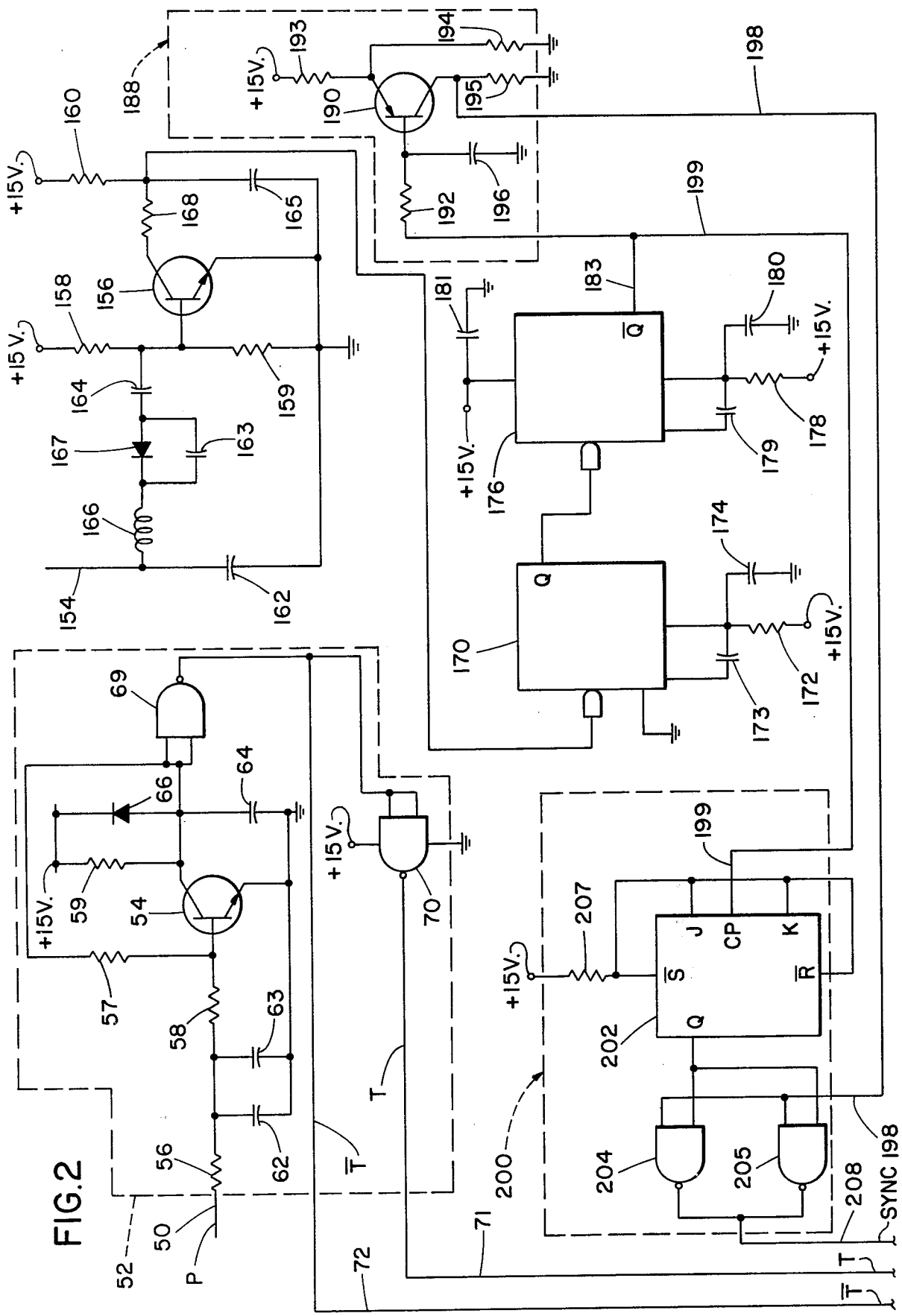
FIG. 2 is an electrical schematic diagram of the signal conditioning, delay and divide-by-two circuits shown in FIG. 1.

Referring to FIG. 2, signal conditioning circuit 52 comprises a transistor 54 which conditions the coil primary signal transmitted over conductor 50 in cooperation with resistors 56–59, capacitors 62–64 and a diode 66. The circuit also includes NAND gates 69, 70 which generate T and $\overline{T}$ signals that serve as clock pulses for multi-state device 80.

Additional conditioning circuitry appropriate for use in connection with multi-state device 80 is described in U.S. Pat. No. 3,788,129 (Trussell — Jan. 29, 1974) in connection with generating circuit 70.

Figure 3:
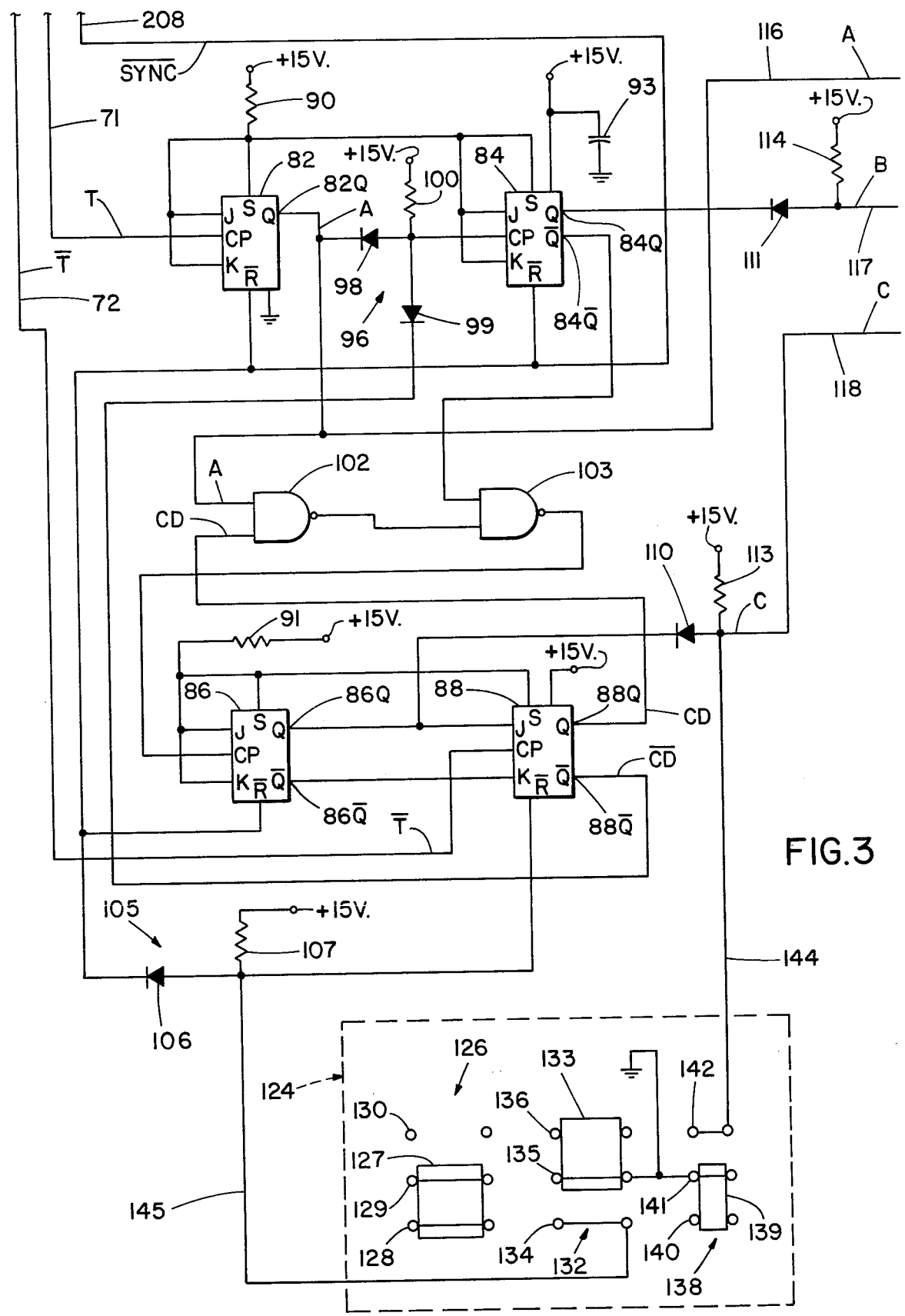
FIG. 3 is an electrical schematic diagram of the variable modulus multi-state device and engine selector shown in FIG. 1.

Referring to FIG. 3, multi-state device 80 includes a bistable circuit comprising J-K flipflop 82 having an output 82Q, a J-K flipflop 84 having complementary outputs 84Q and $84\overline{Q}$, and J-K flipflop 86 having complementary outputs 86Q and $86\overline{Q}$. The bistable circuit is controlled by a gating circuit including a mode signal producing J-K flipflop 88 having complementary outputs 88Q and $88\overline{Q}$. Each of the foregoing flipflops has a J input, a K input, a clock input CP, a Q output, a $\overline{Q}$ output, an S or set input and an $\overline{R}$ or reset input as shown. The flipflops are controlled by resistors 90, 91 and a capacitor 93.

Additional portions of the gating circuit used to control flipflops 82, 84 and 86 comprise an AND gate 96 which includes diodes 98, 99 and a resistor 100. NAND gates 102 and 103 are used to control the operation of the flipflops when a six cylinder engine is being diagnosed. An OR gate 105 comprising a diode 106 and a resistor 107 controls the pulses transmitted to the $\overline{R}$ input of flipflop 88. Diodes 110, 111, and resistors 113, 114 are also included in multi-state device 80. The binary output signals A, B and C generated by the flipflops are transmitted to multiplexer 210 over conductors 116–118.

Another portion of the gating circuit used to control flipflops 82, 84 and 86 is engine selector 124. The selector includes an 8 cylinder switch 126 having a switch arm 127 that moves between terminals 128–130; a 6 cylinder switch 132 including a switch arm 133 that moves between terminals 134–136; and a 4 cylinder switch 138 having a switch arm 139 that moves between terminals 140–142. Switch arms 127 and 139 are shown in the "out" or off position and switch arm 133 is shown in the "in" or on position. Selector 124 communicates with multi-state device 80 over conductors 144 and 145 which are connected as shown.

Referring to FIGS. 1 and 2, signal conditioning circuit 150 receives input signals from an inductive pickup 152 which is clamped around spark plug lead 21. Pick up 152 transmits the signals over a conductor 154 to the circuitry controlling a transistor 156 which includes resistors 158–160, capacitors 162–165, an inductor 166 and a diode 167.

The output from transistor 156 is conducted through a resistor 168 to a one shot multivibrator 170 that produces a 3 millisecond pulse utilized as a noise-blanking signal. The duration of the noiseblanking signal is controlled by the values of capacitors 173, 174 and resistor 172. The output of multivibrator 170 is conducted to another one shot multivibrator 176 which produces a 0.5 millisecond setting pulse on conductor 183. The duration of this setting pulse is determined by the values of capacitors 179, 180 and a resistor 178. Multivibrator 176 is also controlled by a capacitor 181.

The setting pulse is transmitted over conductor 183 to delay circuit 188 which comprises a transistor 190, resistors 192–195, and a capacitor 196, all connected as shown. The delayed setting pulse is transmitted over a conductor 198 to divide-by-two circuit 200, and the $\overline{Q}$ output of multivibrator 176 is transmitted over a conductor 199 to circuit 200.

Circuit 200 comprises a J-K flipflop 202 having a Q output which is gated through NAND gates 204, 205 and is controlled by a resistor 207. The NAND gates transmit a $\overline{\text{SYNCH}}$ pulse to multi-state device 80 over a conductor 208. Flipflop 202 has a J input, a K input, a clock input CP, a set input $\overline{S}$ and a reset input $\overline{R}$, as well as outputs Q and $\overline{Q}$, all connected as shown.

Referring to FIG. 5, multiplexer circuit 210 comprises inverters 212–219, AND gates 220–227, a NOR gate 228, and NAND gate 230, another NAND gate 231, a grounded input conductor 238 and an output conductor 239.

Figure 4:
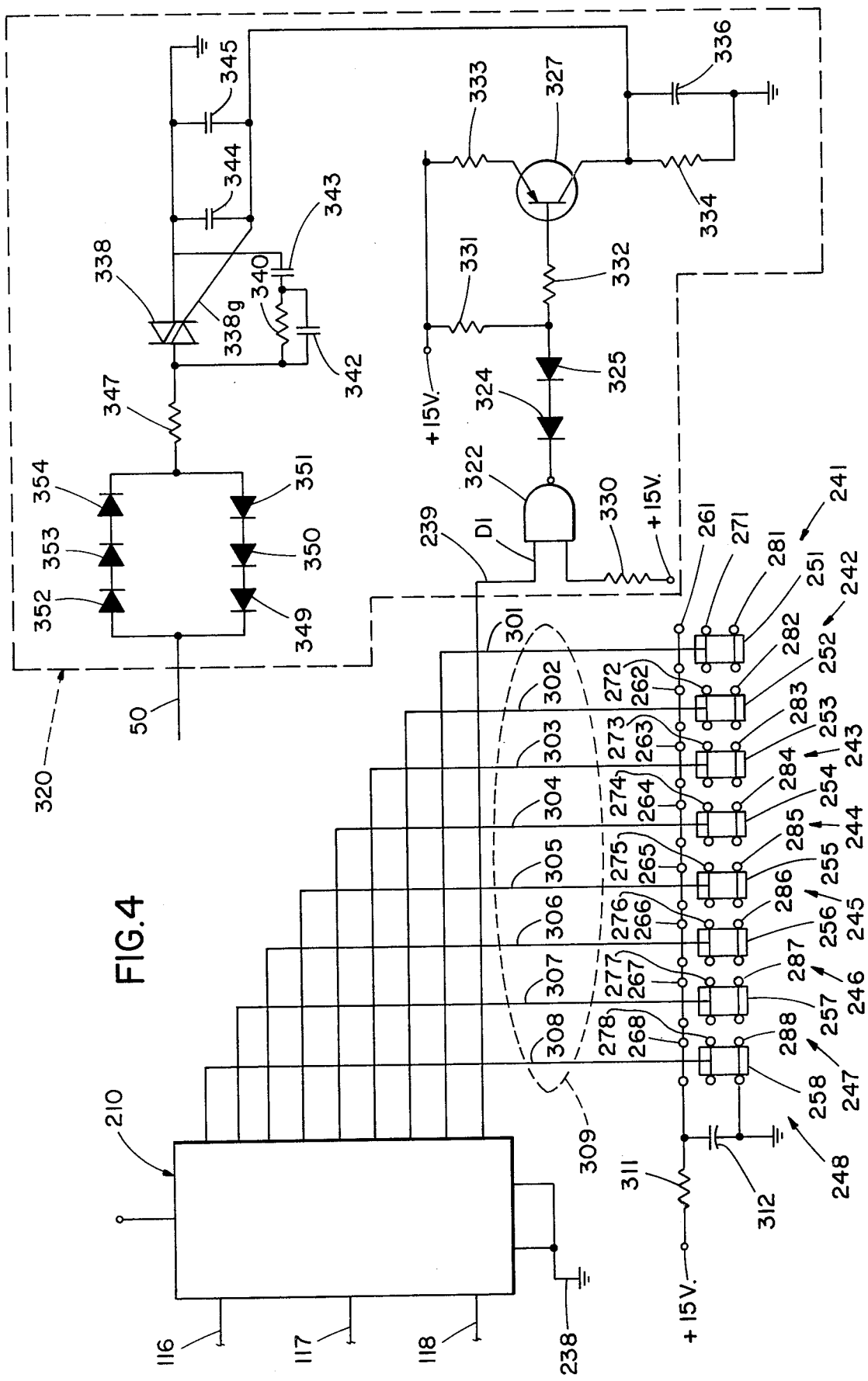
FIG. 4 is an electrical schematic diagram of the multiplexer, cylinder disable push button selector and cylinder shorting devices shown in FIG. 1.

Referring to FIG. 4, cylinder disable selector 240 comprises switches 241–248 including switch arms 251–258, respectively. These switch arms move between upper terminals 261–268, middle terminals 271–278 and lower terminals 281–288, respectively. Switch arms 251–258 are operated by push buttons 291–298, respectively (FIG. 1). The outputs of switches 241–248 are connected through conductors 301–308 to multiplexer 210 by a cable 309. The switches are biased by a resistor 311 and a capacitor 312. Switch arms 251–258 are shown in their out or off positions in which each of input conductors 301–308 is grounded. If one of the switch arms is moved to the in or on position, the corresponding one of input conductors 301–308 is connected to +15 volts through resistor 311.

Cylinder shorting circuit 320 comprises a NAND gate 322 that is biased by a resistor 330, diodes 324, 325 and a transistor 327 that is controlled by resistors 331–334 and a capacitor 336. The circuit also includes a triac 338 having a gate input 338g which is controlled by a resistor 340 and capacitors 342–345. A resistor 347 is connected in series with the triac so that a voltage is developed between conductor 50 and ground when a spark plug is shorted. Diodes 349–354 are also connected in series with triac 338.

DC electrical power is supplied to the circuitry by a power supply, (not shown) which supplies +15 volts DC to the terminals marked +15V. in the drawings.

In order to connect the system to an internal combustion engine, the apparatus is set up as shown in FIG. 1. More specifically, conductor 50 is connected to the distributor coil primary input so that triac 338, resistor 347 and diodes 349–354 are connected across distributor breaker points 32, 33. Pickup 152 is clamped around lead 21 in the manner shown.

The engine is then started and operated at any desired speed. As the number 1 spark plug fires, setting pulses are generated and delayed by the delay circuit 188. The repetition rate of the setting pulses is divided by two in flipflop 202 in order to generate synch pulses. As soon as the first synch pulse is transmitted to multi-state device 80, flipflops 82, 84, 86 and 88 are reset so that their Q outputs are switched to a logical 0 state. Thereafter, the flipflops are returned to their 0 state by the gating circuitry before a synch pulse is received. This feature simplifies the circuitry needed to disable the number 1 spark plug.

When the engine is operated, primary coil signals of the type shown by waaveform P, FIG. 8, are transmitted over conductor 50 to circuit 52. The P signals are used to form clock pulses T and T̄ which operate multistate device 80.

If the engine being diagnosed has eight cylinders, eight cylinder switch 126 is pushed to the in position causing six and four cylinder switches 132 and 138 to be actuated to their out positions by mechanical linkage (not shown). As shown in FIG. 8, in the eight cylinder mode of operation, flipflops 82, 84 and 86 operate as frequency dividers in which the repetition of rate of the clock pulses is divided by two by each successive flipflop. In other words, the repetition rate of the pulses appearing on output A is twice the repetition rate of the pulses appearing on output B and is 4 times and repetition rate of the pulses appearing on output C. The pulses appearing on conductors A, B and C are decoded by the multiplexer depending on the switch arms of selector 240 that are moved to the in position. If switch arm 251 is moved in to disable spark plug 1, a desable pulse D1 is generated to conductor 239 each time spark 1 would normally fire. Pulse D1 switches triac 338 to its conductive state so that the coil primary and secondary signals are reduced to a low voltage insufficient to fire spark plug 1. As shown in FIG. 8, the mode CD signal generated at the Q output of flipflop 88 remains in a 0 state because the reset input R̄ to flipflop 88 is held to ground potential by 6 cylinder switch 132.

Figure 6:
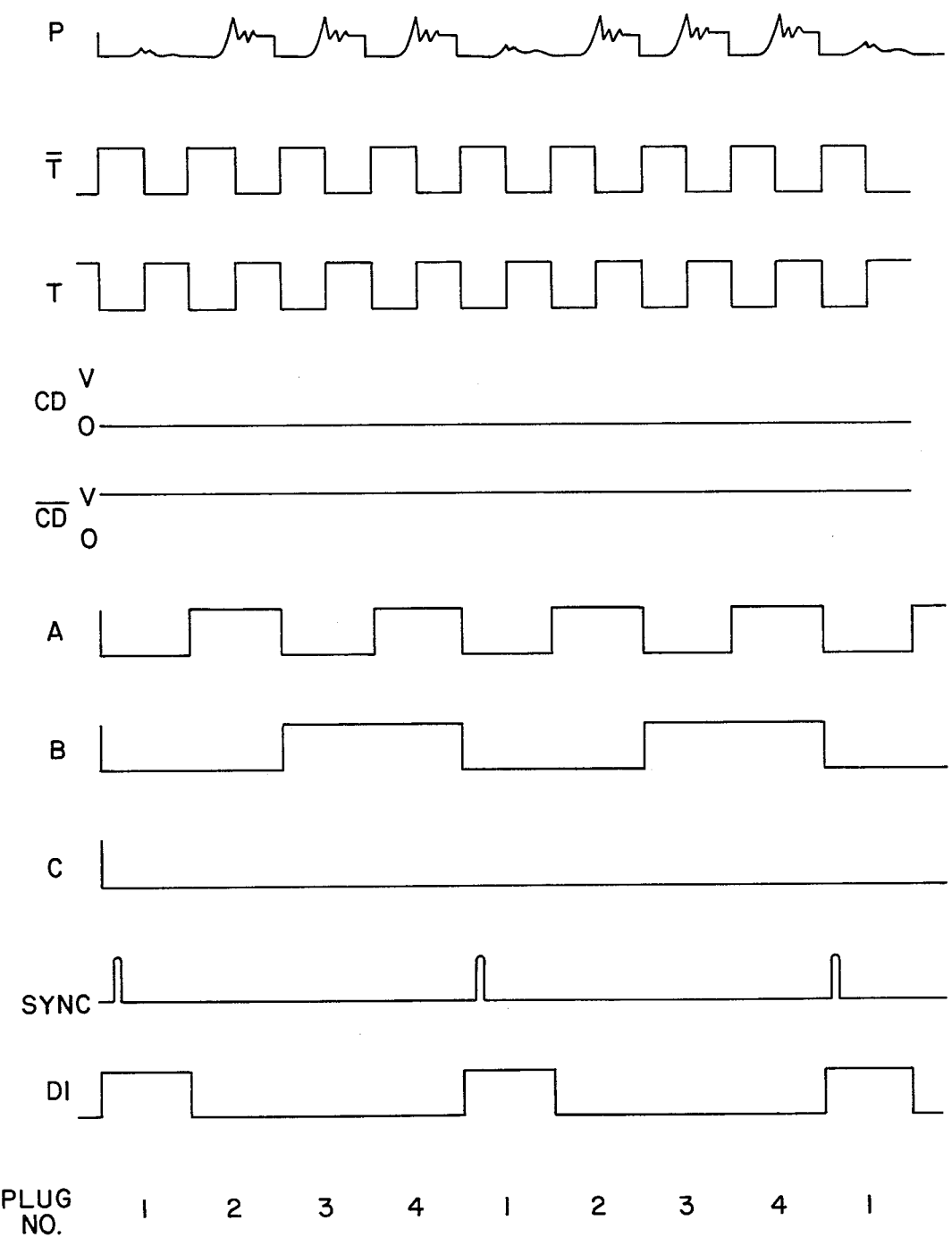
FIG. 6 is a timing diagram illustrating the voltage waveforms at the like-lettered points in the variable modulus multi-state device for the four cylinder mode of operation.

If the engine being diagnosed has four cylinders, the six and eight cylinder switches 132 and 126 are moved to their out positions, and the four cylinder switch 138 is moved to the in position so that the C output from flipflop 86 is held at ground potential. As shown in FIG. 6, flipflops 82 and 84 operate as a frequency divider in which the repetition rate of the signal appearing on output A is double the repetition rate of the signal appearing on output B. Aside from the continued 0 state of output C, and A and B outputs operate identically in the four cylinder and eight cylinder modes. Multiplexer 210 decodes the signals on outputs A, B and C in the same manner as in the 8 cylinder mode. This result can be seen by comparing FIGS. 6 and 8.

If the engine being diagnosed has six cylinders, the eight cylinder and four cylinder switches 126 and 138 are moved to their out positions, and six cylinder switch 132 is moved to the "in" position. In this mode of operation, the R̄ input to flipflop 88 receives a positive enable signal through resistor 107 which enables the CD output state to change. As shown in FIG. 7, the 6 cylinder mode operates in the same manner as the 8 cylinder mode until spark plug 5 is fired. At this point in time, the T̄ input to flipflop 88 causes the mode $\overline{CD}$ signal to change to the same state as output 86Q of flipflop 86 (i.e., the 0 state). As a result, AND gate 96 prevents the positive-going A signal (pulse P6) from being transmitted to flipflop 84. Instead, pulse P6 is routed through NAND gates 102 and 103 to the input of flipflop 86, so that output 86Q is switched to its 0 state on the trailing edge of pulse P6. After output 86Q has reverted to its 0 state, the next T̄ pulse transmitted to flipflop 88 causes output 88Q to return to its 0 state so that signal CD also returns to its 0 state. At this point in time, the flipflops are returned to their initial states for the commencement of another engine cycle. Multiplexer 210 continues to decode output signals A, B and C during the six cylinder mode in the same manner as the signals are decoded in the four and eight cylinder modes. This feature enables the use of a reliable and economical all-electronic multiplexer with no mechanical switch components.

Divide-by-two circuit 200 can be used to advantage for engine diagnosis in the four, six and eight cylinder modes of operation. The applicants have discovered that multi-state device 80 will occasionally "slip" an output signal state and disable an unselected spark plug in response to a spurious ignition signal generated by a spark plug having a gap that is too wide. The slippage is corrected by the next synch pulse. By using delay circuit 188 and divide-by-two circuit 200, the slippage is maintained long enough to be detected by a trained mechanic. The reoccuring slippages and corrections result in engine oscillations which can be detected by ear and used for diagnostic purposes.

Those skilled in the art will recognize that the preferred embodiment shown herein may be alternated and modified without departing from the true spirit and scope of the invention as defined in the accompanying claims.

What is claimed is:

1. In a system for diagnosing an engine including a source of periodic cycles of ignition signals, improved apparatus for preventing one or more predetermined ignition signals in each cycle from energizing engine components which are normally energized by said predetermined ignition signals comprising in combination:

input means for receiving said periodic cycles of ignition signals from said source;

generating means for generating a clock pulse in response to the receipt of each ignition signal by the input means;

bistable means for generating first, second and third binary output signals each having an initial state and for changing the state of at least one of the said binary output signals in a predetermined sequence in response to each clock pulse so that said first, second and third binary output signals can represent eight different binary numbers, said bistable means comprising first flipflop means including a first clock input for receiving the clock pulses and including a first output for producing the first binary output signal, second flipflop means including a second clock input for receiving the first binary output signal and including a second output for producing the second binary output signal, and third flipflop means including a third clock input for receiving the second binary output signal and including a third output for producing the third binary output signal;

setting means for initially setting the binary output signals to said initial states by use of a setting pulse generated in response to the operation of a predetermined one of said engine components;

gating means responsive to predetermined states of the first, second and third binary output signals and the clock pulses for returning said binary output signals to their initial states prior to the receipt of said setting pulse, said gating means comprising first gate means for normally transmitting the first binary output signal to the second clock input and for blocking the transmission of the first binary output signal to the second clock input in response to a mode signal, second gate means for normally transmitting the second binary output signal to the third clock input and for transmitting the first binary output signal to the third clock input in response to the mode signal, means for producing the mode signal in response to an enable signal and the third binary output signal and for terminating the mode signal in response to the termination of the third binary output signal or the termination of the enable signal, and means for normally inhibiting the enable signal and for producing the enable signal when the source generates six ignition signals per cycle;

adjustable selecting means for producing a disabling pulse in response to predetermined states of the first, second and third output signals; and disabling means responsive to the disabling pulse for preventing any simultaneously occurring ignition signal from energizing an engine component, whereby the first, second and third output signals are in the same state each time a predetermined one of the engine components is prevented from being energized.

2. Apparatus, as claimed in claim 1, wherein the means for producing the mode signal comprises:

fourth flipflop means including a fourth input connected to the third output, a fourth output for producing the mode signal, a fifth output for producing a complement mode signal which is the complement of the mode signal, and a fourth clock input; and means for transmitting inverted clock pulses to the fourth clock input.

3. Apparatus, as claimed in claim 2, wherein the third flipflop means comprises a complementary third output for producing a complement third output signal which is the complement of the third binary output signal, and wherein the fourth flipflop means comprises a fifth input connected to the complementary third output.

4. Apparatus, as claimed in claim 3, wherein the first gate means comprises an AND gate.

5. Apparatus, as claimed in claim 4, wherein the second gate means comprises a pair of NAND gates.

6. Apparatus, as claimed in claim 1, wherein the adjustable selecting means comprises a multiplexer including a first terminal operatively connected to the first output, a second terminal operatively connected to the second output and a third terminal operatively connected to the third output, said multiplexer comprising all-electronic gate means for producing the disabling pulse.

7. Apparatus, as claimed in claim 1, and further comprising delay means for delaying the transmission of the setting pulse so that the first, second and third flipflop means are advanced to their initial states by a clock pulse and the gating means before the setting pulse is applied to the first, second and third flipflop means.

8. Apparatus, as claimed in claim 1, and further comprising divider means for dividing the repetition rate of the setting pulses before the pulses are trasmitted to the bistable means.

9. In a system for diagnosing an engine including a source of periodic cycles of ignition signals in which one signal in each cycle is occasionally missed, improved apparatus for preventing one or more predetermined ignition signals in each cycle from energizing engine components which are normally energized by said predetermined ignition signals comprising in combination:

input means for receiving said periodic cycles of ignition signals from said source;

generating means for generating a clock pulse in response to the receipt of each ignition signal by the input means;

multi-state means for producing periodic cycles of binary output signals in which the state of the output signals change in response to the receipt of each clock pulse and in which the output signals normally return to an initial state after the receipt of a predetermined number of clock pulses;

adjustable selecting means for producing a disabling pulse in response to a predetermined state of the output signals;

disabling means responsive to the disabling pulse for preventing any simultaneously-occurring ignition signal from energizing an engine component;

removable setting means for generating a series of setting pulses, each setting pulse being generated in response to the operation of a predetermined one of the engine components by an ignition signal;

divider means for producing a synch pulse in response to the receipt of each group of two or more setting pulses; and means for returning the output signals to the initial state in response to the next synch pulse following one of said missed ignition signals, whereby the time delay between the receipt of the missed ignition signal and the receipt of the next subsequent synch pulse by the multistate means can be used to diagnose the engine.

* * * * *